Patented Apr. 6, 1943

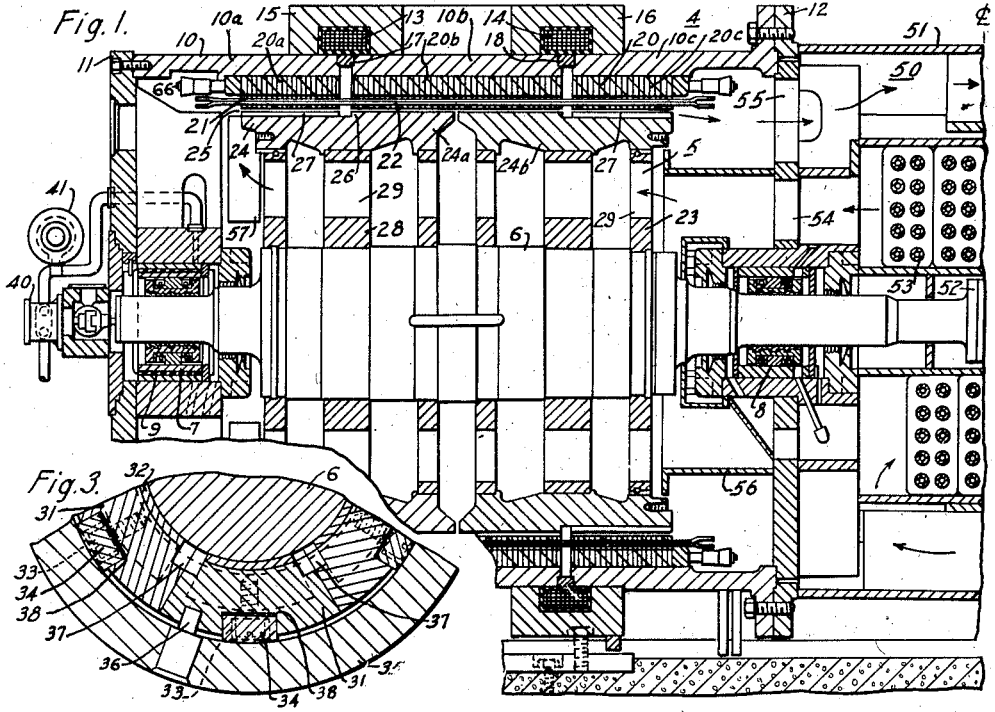

2,315,653

UNITED STATES PATENT OFFICE 2,315,653

VENTILATED MACHINE

Ernest I. Pollard, Wilkinsburg, and Rene A. Baudry, Pittsburgh, Pa., assignors to Westinghouse Electric & Manufacturing Company, East Pittsburgh, Pa., a corporation of Pennsylvania Application June 21, 1941, Serial No. 399,086

9 Claims. (Cl. 171—252)

Our invention relates to ventilated machines, and it has particular relation to various features of the cooling of a hydrogen-cooled motor-generator set, with particular reference to the high-frequency inductor-type generator of said set.

While our invention is acceptable for other uses and applications, it was particularly designed for a 500 kw., 9600-cycle inductor-type hydrogen-cooled generator which is used as a source of electrical power for induction-heating applications. An inductor-type generator is one in which the main windings of the generator are located in stator-slots, between teeth in which flux-pulsations are produced by corresponding teeth on the rotor-member. These machines present special design-problems. For example, in order for the tooth-flux pulsations, in the stator-teeth, to be large, so that a reasonably large E. M. F. is induced in the stator-conductors, it is quite necessary, in such machines, that the radial thickness of the air-gap shall be small, much smaller than is required in ordinary machines, it being particularly necessary that the air-gap be smaller than 0.2 of the stator slot pitch. The smallness of the air-gap presents ventilating-problems, with regard to the difficulty of getting sufficient ventilating-gas through the air-gap, and it also presents bearing-problems, because the bearing clearance in ordinary sleeve bearings becomes an appreciable percentage of the air-gap length, so that the unbalanced magnetic pull with the rotor displaced from central by half the bearing clearance becomes quite large.

Our present invention relates to various improvements in a motor-generator set in which the generator-part is an inductor-type generator of the class just mentioned, including such features as: the disposition of coolers between the motor and the generator, preferably disposed at right angles to the shaft, with a cylindrical cooler-housing member bridging the space between the two machines; the provision of means for providing a gas-flow from the cooler, axially through the generator-spider, thence through a generator-blower, and returning, at considerable pressure, through the narrow air-gap of the generator; the use of generator-bearings of the segmental-shoe type, or other type having a small radial clearance on the shaft; the enclosure of the motor, the generator, and the shaft-coupling in a common explosion-resistant gas-tight housing, preferably with hydrogen as the gaseous cooling-medium for ventilating the machines, and preferably utilizing the cylindrical yoke of the generator as a part of the explosion-resistant gas-tight housing; and other features, such as the supplementing of the generator-cooling with water-circulating cooling-pipes in the core, and the utilization of more than one field-coil on the generator, with the inductor-rotor tooth-projections circumferentially offset with respect to each other in the places where the magnetic flux moves in opposite directions across the air-gap.

A further object of our invention is to avoid the troubles which have been experienced with previous machines of the general type in question, particularly those which have involved the use of hydrogen-carrying ducts outside of the generator, for bringing back some, or a major portion, of the hydrogen from one end of the machine to the other, and involving the location of the cooler outside of the outer peripheral confines of the generator.

With the foregoing and other objects in view, our invention consists in the parts, devices, combinations, systems, and methods, hereinafter described and claimed, and illustrated in the accompanying drawing, wherein:

Figure 1 is a longitudinal sectional view of the generator-part of a motor-generator set embodying our invention;

Fig. 2 is a similar view of the motor-part, it being understood that these two parts are integrally united together, the longitudinal section being split into two views, merely for convenience of illustration; and Fig. 3 is a detailed transverse sectional view of bearing No. 2 of the generator.

In the drawing, we have illustrated our invention as applied to a particular size, rating, and kind of a motor-generator set, although we wish it to be understood that, at least in its broader aspects, our invention is not limited to any particular machine, but has certain features of general application, the particular showing being intended, to this extent, only for purposes of illustration.

Our invention is shown as being applied to a motor-generator set or unit comprising a generator (Fig. 1) and a motor (Fig. 2) mounted in axial alignment, with the shafts thereof either coupled together or, if desired, built into a single solid shaft extending through both machines.

As shown in Fig. 1, the generator comprises a stator-member or stationary frame, which is generally indicated by the numeral 4, a rotor-member which is generally indicated by the numeral 5, a generator-shaft 6, and generator-bearings 7 and 8, the first bearing 7 being insulated, as shown at 9.

In more detail, the generator-stator 4 comprises a cylindrical magnetic yoke 10 and two end-brackets 11 and 12. The yoke 10 is magnetically energized by means of direct-current field-coil-means which are preferably in the form of one or more (preferably two) magnetizing-coils 13 and 14 which encircle the yoke 10 around its outer periphery, with the magnetic fluxes induced by the two field-coils 13 and 14 flowing in opposite axial directions with respect to the cylindrical yoke 10. Each of the field-coils 13 and 14 is surrounded, externally, by its own annular magnetizable flux-path or ring 15 and 16, respectively, which engages the outer periphery of the cylindrical yoke 10. In order to limit the flux-leakage axially along the yoke 10, said yoke is split magnetically, underneath the center of each field-coil 13 and 14, by means of non-magnetic steel rings 17 and 18, respectively, which are welded in place between the successive ring-like cylindrical sections 10a, 10b, and 10c of the yoke 10. The inner bore of the yoke supports a laminated magnetizable stator-core 20 which is likewise disposed in three axially-shaped sections 20a, 20b, and 20c corresponding to the sections of the yoke 10. The bore of the laminated core 20 is slotted, preferably with slots 21, which extend axially, in a straight line, through all three sections 20a, 20b, and 20c of the stator-core 20; and placed in these slots 21 are the conductors of the stator-windings 22 in which the high-frequency generator-current is induced.

The rotor-member 5 of the generator, as shown in Fig. 1, comprises a magnetizable annular inductor-type rotor-member 24 which is disposed within the bore of the stator-core 20, and separated therefrom by a radially narrow air-gap 25, as previously explained. The inductor-member 24 is provided with axially extending, peripheral tooth-projections 26, separated by slots 27. The inductor-member 24 of the rotor is conveniently divided into two parts 24a and 24b, corresponding to the two field-coils 13 and 14 of the stator. The function of the inductor-rotors 24a and 24b is to provide a return-path for the flux which circulates around the respective field-coils 13 and 14, crossing the air-gap 25 in one direction, for example, from the intermediate stator-core 20b, into the center halves of the respective inductor-members 24a and 24b, and returning, in the other direction across the air-gap, into the stator-cores 20a and 20c, respectively, from the outer halves of the rotor-inductors 24a and 24b, respectively. In order that the electromotive forces may be induced in the same direction, in the portions of the stator-conductors 22 which are traversed by air-gap fluxes flowing in opposite directions, it will be noted that the inner halves of the rotor inductors 24a and 24b, which carry the air-gap flux in one direction, are provided with rotor-teeth 26, in the plane represented by the longitudinal section shown in Fig. 1, whereas a rotor-slot 27 comes in the other portions of the rotor-inductors 24a and 24b.

The rotor-inductor 24, or the component parts 24a and 24b thereof, are supported on a plurality of spider-rings 28 which are provided with a plurality of gas-flow holes or openings 29, as indicated, for providing for an axial flow of gas through the spider-members 28 of the generator-rotor 5. The spider-rings 28 are pressed or shrunk onto the generator-shaft 6.

The generator-shaft 6 is supported in the generator-bearings 7 and 8 which are, in turn, supported from the two end-brackets 11 and 12 of the generator. As previously indicated, the requirement for maintaining a very narrow air-gap 25 between the stator and rotor-members of the generator has introduced bearing-problems, because of the small clearances which must be maintained. In the present invention, we have, therefore, adopted a segmental-shoe type of generator-bearing, for the bearings 7 and 8, as described and claimed in a companion application of Tichvinsky and Baudry, Serial No. 362,966, filed October 26, 1940, and assigned to the Westinghouse Electric & Manufacturing Company.

This segmental-shoe type of bearing, as shown, for example, in Fig. 3, utilizes six (or other number of) segmental bearing-shoes 31 having babbitted inner-surfaces 32 which bear on the shaft 6. The outer portions of the shoes 31 are provided with slightly projecting seats or abutments 33 which are provided by hardened steel inserts 34, and which seat within the inner bore of a solid retainer-ring 35. The rotation of the bearing-shoes 31 within the retainer-ring 35 is prevented by suitable keys 36.

These shoe-type guide-bearings have the advantage of providing for the flow of a copious amount of lubricating-oil, which is also utilized as a bearing-cooling means, by being provided with axially extending slots or grooves 37 at each end of each of the segments 31, adjacent to the babbitted surfaces 32, and they have the further advantage of being susceptible of being adjusted to a very small radial clearance on the shaft, which fit can be adjusted, if necessary, during the process of assembly of the bearing, by removing the metal inserts 34, and placing shims 38 thereunder. Because each of the segmental shoes 31 is capable of tilting slightly on its rear abutment 33, it is capable of making provision for a thin wedge-shaped film of oil between its babbitted surface 32 and the shaft 6, and it is possible to provide the same thin wedge-shaped film of oil under each one of the six shoes 31, so that the same small clearance is provided all of the way around the shaft. This is in sharp distinction from the conditions existing in an ordinary journal bearing, which has a small clearance at the portion of the bearing which takes the downward thrust, and a rather large clearance at the diametrically opposite portion of the bearing.

Oil is supplied to all of the bearings of our motor-generator set, by means of a single direct-connected oil-pump 40 which is shown at the left-hand end of the generator-shaft 6, the oil being cooled by being passed through an oil-cooler 41 which is immediately above the pump 40.

As shown in Fig. 2, the illustrated motor has a frame including a cylindrical housing-member 42 and two end-brackets 43 and 44. The motor also has a rotor-member 45 which is mounted on a motor-shaft 46. The motor-shaft 46 is rotatably supported in any suitable guide-bearings, such as ordinary journal-bearings 47 and 48, respectively, which are carried by the respective end-brackets 43 and 44 of the motor.

The frames of the motor and generator are axially spaced from each other, and this space 50, between the two machines, is bridged over by a cylindrical housing-member 51. The motor and generator shafts 46 and 6 have shaft-extensions which come together in this space 50 between the two machines, and the two shafts are either permanently united or detachably coupled together, as through a shaft-coupling, such as is shown at 52.

An important feature of our invention relates to the means for cooling our motor-generator set, and particularly the means for cooling the inductor-type generator-part of the set, in which the cooling-problems are particularly difficult. An important feature of our novel cooling-means includes the use of circulating-liquid coolers 53 which are disposed within the coupler-space or chamber 50, between the two machines, the coolers 52 being preferably disposed as a plurality of elongated units which can be inserted and removed by a movement in a plane approximately at right angles to the shaft, as by drawing the cooler-units 53 out and in, by pulling them toward and away from the observer as the device is seen in Figs. 1 and 2.

For cooling our motor-generator set, we preferably utilize hydrogen, as the gaseous cooling-medium, because the use of hydrogen produces so much more effective cooling than air, that we are able to save some 30% in the size of the machine, particularly in the size of the inductor-type generator, in which a saving in size is particularly advantageous because of its relatively large dimensions, anyway, in comparison with the dimensions of an ordinary machine, not of the inductor-type. In accordance with our invention, therefore, we provide an overall, substantially gas-tight, housing, including the motor, the generator, and the intervening coupling-space 50, and we fill this enclosed space with hydrogen, after having driven out the air. By utilizing a single hydrogen-enclosing housing including the entire motor-generator unit, we avoid difficulties attendant upon the maintenance of hydrogen-tight seals surrounding the places where the shaft passes through a housing. In common with all other hydrogen-cooled dynamo-electric machines, it is necessary for our hydrogen-enclosing housing to be sufficiently strong, in design, to be explosion-resistant, and to this end we find it a relatively simple matter to utilize, as parts of our explosion-resistant housing, the outer or left-hand generator end-bracket 11, the cylindrical yoke 10 of the generator, the coupler- or cooler-housing 51, the motor-housing 42, and the outer or right-hand motor end-bracket 44.

Suitable gas-circulating means, in the form of holes, passageways, baffles, gas-flow guiding means, and blowers, are provided, for maintaining one or more enclosed-path gas-circulating cooling-means, whereby a cooling gas (preferably hydrogen, as above described) is circulated through the generator and through some or all of the coolers 53 in the space 50 between the two machines. The same gas-circulating path, or a different gas-circulating path (as actually shown), may be provided for cooling the motor as well as the generator.

For ventilating the generator, the inner generator end-bracket 12, or the end-bracket adjacent to the coolers 53, is provided with gas-flow inlet and outlet openings 54 and 55, the inlet-openings 54 being closer to the bearing 8. By means of a cylindrical baffle 56 at the adjacent end of the generator, the inlet gas which comes into the generator through the inlet-opening or openings 54, passes axially through the ventilating-holes or openings 29 in the generator-spider-plates 28, and thence to a generator-blower 57 which is carried by the generator-shaft 6 at the far end of the generator, that is, at the end of the generator-rotor 24 which is furthest away from the coolers 53 which are disposed in the coupling-space 50 between the two machines. The generator-blower 57 creates a considerable pressure-head of gas, which is necessary in order to force this gas to return through the relatively small air-gap 25, so that all of the cooling-gas returns axially through the air-gap 25, and leaves the generator through the outlet-opening or opening 55 in the end-bracket 12 of the generator. The generator-cooling gas then flows within the coupler-space 50, outside of the coolers 53, and returns through the upper bank of coolers 53, to return to the generator through the inlet-opening 54, as previously described, suitable baffles being provided for this purpose.

The generator-ventilation, just described, is facilitated by our generator-design utilizing two field-coils 13 and 14, and utilizing a type of yoke 10 having non-magnetic inserts 17 and 18 therein, with the field-coils disposed outside of the yoke 10, at the places where said inserts 17 and 18 are located, instead of a construction in which the field-coil is placed between two axially separated yoke-portions 10a and 10b, or 10b or 10c, in the place where our non-magnetic inserts 17 and/or 18 are located. The use of two field-coils 13 and 14 divides the total magnetic flux into two halves, and thus reduces the required radial thickness of the magnetizable inductor-type rotor-member 24 necessary to carry the flux of each field-coil. In this manner, we reduce the required outer diameter of the generator, bringing it down to a diameter which can conveniently be matched by the diameters of the cooler-housing 51 and the motor-frame 42, as shown. The use of field-coils encircling the yoke 10 reduces the axial length of the generator, which is also critical.

For ventilating the motor which is shown in Fig. 2, the problems are not so severe, as the motor-design is not as critical as that of the generator, and the motor is of smaller size, so that it is usually convenient to provide for a gas-circulating path for the motor, including gas-carrying, and gas-returning ducts 59 and 60 outside of the stator-core 61. The inner end-bracket 43 of the motor, or the end-bracket closest to the coolers 53, is provided with inlet and outlet gas-flow openings 62 and 63, respectively, which are separated, within the motor, by suitable baffles 64. The cooling-gas enters the motor through the inlet-opening or openings 62, and thence passes directly into a motor-blower 65, which causes the cooling-gas to flow first through the duct or ducts 59, thence returning, through the motor, to the return-duct or ducts 60, after which the cooling-gas leaves the motor through the outlet duct or ducts 63 and enters the intermediate coupler-space 50 between the two machines, passing under the bottom bank of coolers 53, and then passing through these coolers 53, to again enter the inlet-openings 62 into the motor-housing.

We usually find it desirable to supplement the hydrogen-cooling of the generator by means of an additional cooling-means, in the form of a circulating-liquid cooler 66 including axially extending water-cooled pipes disposed in the stator-core 20 of the generator, back of the core-slots 21. By this means, some of the heat is removed from the vicinity of the stator-windings 22 of the generator, or close to the places where a major portion of the heat is generated within the generator, thus supplementing the cooling-function of the circulated gaseous cooling-medium, such as hydrogen.

We claim as our invention:

1. A unit comprising two machines; each machine having a stationary member including a frame-housing, and a rotatable member including a shaft; the two frame-housings being axially spaced from each other, and the two rotatable members being coupled together through shaft-portions extending between the two machines; a housing-member enclosing the space between the two frame-housings; a circulating-liquid cooler disposed within said enclosed space between the two frame-housings; and enclosed-path gas-circulating means for at least one of said machines, including gas-flow openings in the end of said machine between the machine and the cooler-space, gas-flow passages and guiding-means, and blower-means, for circulating gas through said machine and cooler.

2. The invention as defined in claim 1, characterized by said cooler including a removable cooler-unit which is removable by movement in a plane approximately at right angles to the shaft.

3. A motor-generator unit, comprising an electric motor and an inductor-type electrical generator; said generator comprising: a stator-member having a cylindrical magnetic yoke, two end-brackets, field-coil-means encircling said yoke, annular magnetizable means surrounding said field-coil-means for completing a magnetic path around the same, a laminated magnetizable stator-core disposed within said yoke and having a slotted bore, and stator-windings disposed in the core-slots; and a magnetizable annular inductor-type rotor-member disposed within the bore of the stator-core and having peripheral tooth-projections, spider-means for supporting said inductor-member, a shaft for supporting said spider-means, and a blower for circulating a gaseous cooling-medium, said spider-means having gas-flow openings for providing for an axial flow of said gaseous cooling medium therethrough; said motor comprising a motor-stator, and a motor-rotor mounted on a shaft; the motor-stator being axially spaced from the generator-yoke, and the motor and generator rotors being coupled together through shaft-portions extending between the two machines; a housing-member enclosing the space between the two machines; and a circulating-liquid cooler disposed within said enclosed space between the two machines; the generator-end-bracket adjacent to the cooler having gas-flow inlet and outlet openings; the generator-blower being at the opposite end of the generator; and the cooler-space and the adjacent end of the generator having gas-guiding means for providing an enclosed-path gas-circulation from said blower, axially through the air-gap between the generator-stator and the generator-rotor, thence outside of the generator through said outlet-opening in said end-bracket, thence in paths which include said cooler and back into the generator through said inlet-opening in said end-bracket, and finally back axially through the spider-openings to the blower, whereby substantially all of the gaseous cooling-medium of the generator circulates in this manner.

4. An inductor-type electrical generator comprising: a stator-member having a cylindrical magnetic yoke, two end-brackets, field-coil-means encircling said yoke, annular magnetizable means surrounding said field-coil-means for completing a magnetic path around the same; a laminated magnetizable stator-core disposed within said yoke and having a slotted bore, and stator-windings disposed in the core-slots; a magnetizable annular inductor-type rotor-member disposed in the bore of the stator-core and having peripheral tooth-projections; a shaft for supporting rotor-member; and bearings for rotatably supporting said shaft in said end-brackets; the air-gap between the stator and rotor being small, and the bearings being of a segmental-shoe type having a small radial clearance on the shaft.

5. An inductor-type electrical generator comprising: a stator-member having a cylindrical magnetic yoke, two end-brackets, field-coil-means encircling said yoke, annular magnetizable means surrounding said field-coil-means for completing a magnetic path around the same, a laminated magnetizable stator-core disposed within said yoke and having a slotted bore, and stator-windings disposed in the core-slots; a magnetizable annular inductor-type rotor-member disposed within the bore of the stator-core and having peripheral tooth-projections, spider-means for supporting said inductor-member, a shaft for supporting said spider-means, and a blower for circulating a gaseous cooling-medium, said spider-means having gas-flow openings for providing for an axial flow of said gaseous cooling-medium therethrough; means, including said cylindrical yoke and at least one of said end-brackets, for providing an explosion-proof, substantially gas-tight enclosure for said generator; and a filling of hydrogen within said enclosure.

6. A motor-generator unit, comprising an electric motor and an inductor-type electrical generator; said generator comprising: a stator-member having a cylindrical magnetic yoke, two end-brackets, field-coil-means encircling said yoke annular magnetizable means surrounding said field-coil-means for completing a magnetic path around the same, a laminated magnetizable stator-core disposed within said yoke and having a slotted bore, and stator-windings disposed in the core-slots; and a magnetizable annular inductor-type rotor-member disposed within the bore of the stator-core and having peripheral tooth-projections, spider-means for supporting said inductor-member, a shaft for supporting said spider-means, and a blower for circulating a gaseous cooling-medium, said spider-means having gas-flow openings for providing for an axial flow of said gaseous cooling-medium therethrough; said motor comprising a motor-stator, and a motor-rotor and a motor-blower mounted on a shaft; the motor-stator being axially spaced from the generator-yoke, and the motor and generator rotors being coupled together through shaft-portions extending between the two machines; a housing-member enclosing the space between the two machines; the motor-frame having gas-flow inlet and outlet openings on the end adjacent to the cooler, and being otherwise substantially gas-tight; the generator-end-bracket adjacent to the cooler having gas-flow inlet and outlet openings; the generator-blower being at the opposite end of the generator; the outer end-bracket of the generator, the generator-yoke, the cooler-housing, and the substantially gas-tight part of the motor-frame comprising an explosion-proof, substantially gas-tight enclosure for the motor-generator unit; and a filling of hydrogen within said enclosure; the motor-frame, the cooler-space, and the adjacent end of the generator having gas-guiding means for providing enclosed-path gas-circulation cooling-means for said motor and said generator.

7. The invention as defined in claim 5, characterized by said generator having at least two field-coil-means encircling said yoke at axially spaced points, the two field-coil-means having oppositely directed fluxes, and the inductor-rotor tooth-projections being circumferentially offset with respect to each other in the places where the magnetic flux moves in opposite directions across the air-gap between the stator and rotor.

8. The invention as defined in claim 6, characterized by said generator having at least two field-coil-means encircling said yoke at axially spaced points, the two field-coil-means having oppositely directed fluxes, and the inductor-rotor tooth-projections being circumferentially offset with respect to each other in the places where the magnetic flux moves in opposite directions across the air-gap between the stator and rotor.

9. A unit comprising two machines, each machine having a stationary member including a frame-housing, and a rotatable member including a shaft; the two frame-housings being axially spaced from each other, and the two rotatable members being coupled together through shaft-portions extending between the two machines; a housing-member enclosing the space between the two frame-housings; and a circulating-liquid cooler disposed within said enclosed space between the two frame-housings; one of said machines being an inductor-type electrical generator, the frame-housing of the generator comprising a cylindrical magnetic yoke, two end-brackets, field-coil-means encircling said yoke, annular magnetizable means surrounding said field-coil-means for completing a magnetic path around the same, a laminated magnetizable stator-core disposed within said yoke and having a slotted bore, stator-windings disposed in the core-slots, and axially extending circulating-liquid cooler-pipes disposed in said stator-core back of the core-slots, the rotatable member of the generator including a blower; the generator-end-bracket adjacent to the space between the two machines having gas-flow inlet and outlet openings; and gas-flow guiding-means cooperating with the generator-blower for providing an enclosed-path gas-circulating cooling-means whereby a cooling-gas is circulated through the generator and through the cooler in the space between the two machines.

ERNEST I. POLLARD.
RENE A. BAUDRY.